July 7, 1936.   M. E. CARLISLE   2,046,446
PROCESS AND APPARATUS FOR LAMINATING GLASS SHEETS
Filed Feb. 16, 1935   2 Sheets-Sheet 1
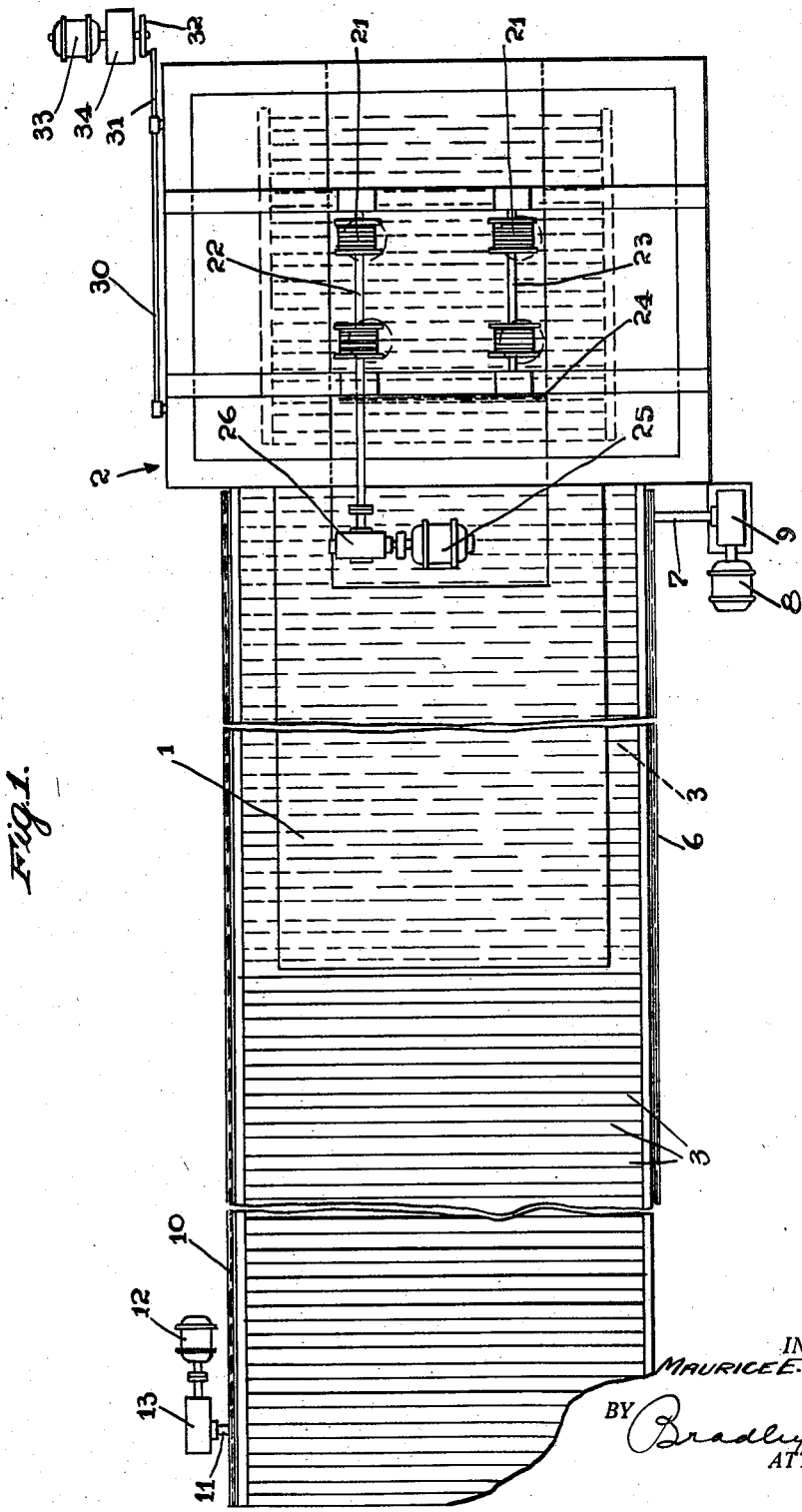

July 7, 1936.  M. E. CARLISLE  2,046,446
PROCESS AND APPARATUS FOR LAMINATING GLASS SHEETS
Filed Feb. 16, 1935   2 Sheets-Sheet 2
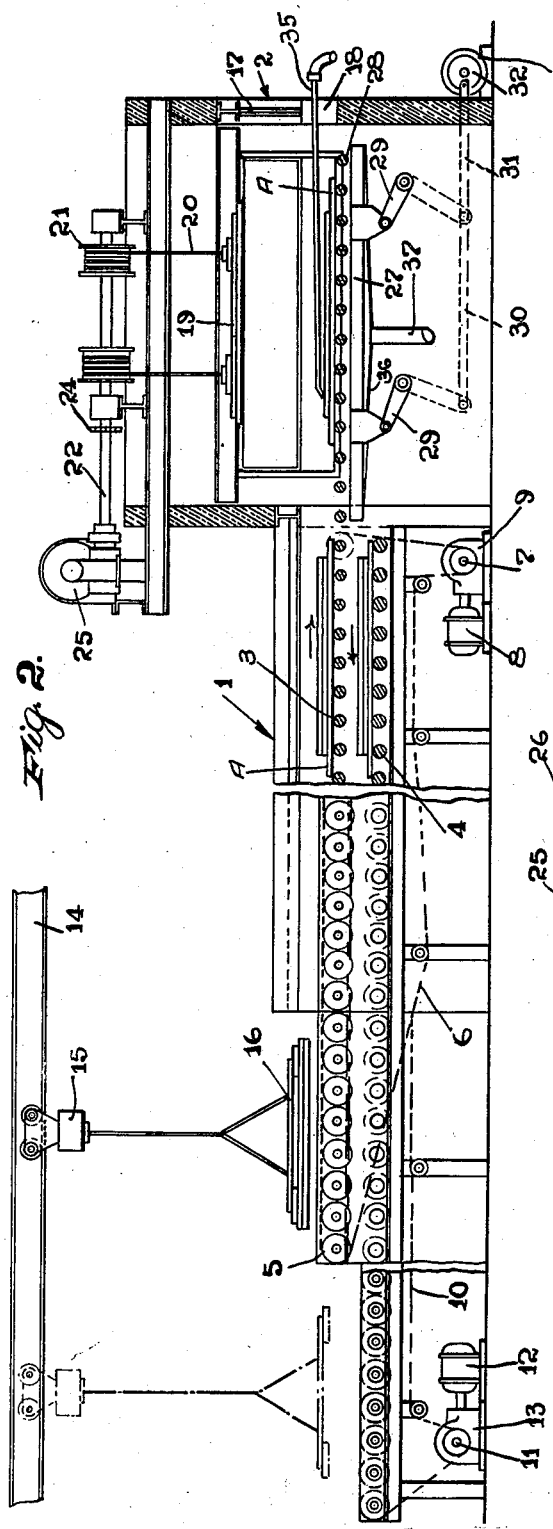
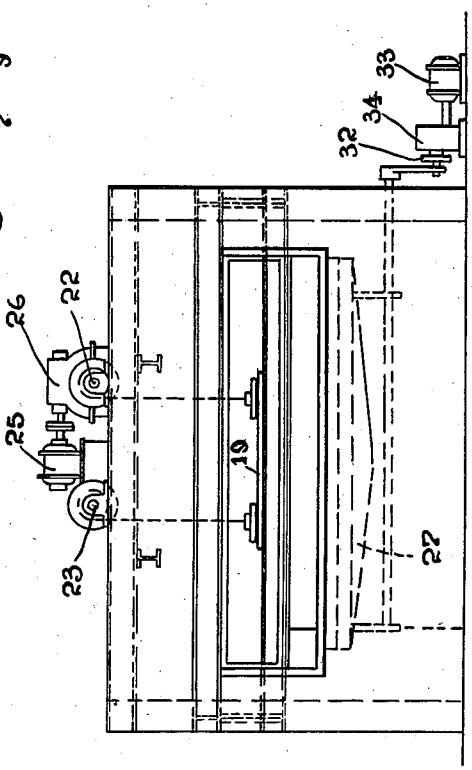
INVENTOR.
MAURICE E. CARLISLE
BY Bradley + Bee
ATTORNEYS.

Patented July 7, 1936

2,046,446

UNITED STATES PATENT OFFICE 2,046,446

PROCESS AND APPARATUS FOR LAMINATING GLASS SHEETS

Maurice E. Carlisle, Ben Avon, Pa., assignor to Pittsburgh Plate Glass Company, Allegheny County, Pa., a corporation of Pennsylvania Application February 16, 1935, Serial No. 6,854

5 Claims. (Cl. 49—81)

The invention relates to a process and apparatus for laminating glass sheets, and is designed particularly for forming colored glass sheets, such as the well known Carrara glass, into thicker plates for use in structural work. The sheets are ordinarily cemented together with asphalt, but other adhesives having similar characteristics, or which may act as reinforcing, may be employed. The invention has for its objects the provision of an improved process and apparatus whereby the laminating operation may be carried out efficiently at a low cost and without danger of breakage incident to handling and to changes in temperature required in the cementing operation. One embodiment of the invention is illustrated in the accompanying drawings, wherein:

Figure 1 is a plan view. Fig. 2 is a side elevation, partially in section. And Fig. 3 is an end elevation.

Referring to the drawings, 1 is a tunnel kiln and 2 is the laminating room or chamber into which the tunnel kiln leads. The tunnel kiln is of the roller type and includes two runways arranged one above the other, as indicated in Fig. 2, and consists of the sets of rolls 3 and 4, the rolls of the upper runway being driven so as to carry the plates to be laminated toward the laminating room, as indicated by the arrow, while the rolls of the lower runway are driven in the reverse direction so as to carry the laminated plates to the left from the laminating chamber. The rolls of the upper runway are provided at their ends with sprockets 5 around which passes the chain 6. This chain is looped around the drive shaft 7, and such shaft is driven from a motor 8 through the intermediary of reduction gearing in the casing 9. The lower runway rolls are similarly provided at their ends with sprockets and these sprockets are driven from a chain 10 which passes around the drive shaft 11, such drive shaft being driven from the motor 12 through reduction gearing in the casing 13.

Adjacent the left hand end of the tunnel kiln is a transfer apparatus comprising the rail 14, on which is mounted the crane 15, such crane carrying a suitable vacuum frame 16. This crane is employed to bring the glass sheets to be laminated into position over the end of the upper runway of the kiln and deposit them upon such runway. This vacuum frame is also employed to remove the laminated plates from the left hand end of the lower runway and transfer them to suitable racks for storage. The sheets to be laminated may for example consist of ½" sheets of Carrara glass having one face either fire polished or ground and polished, and the other side rough. These plates are placed in pairs on the upper runway by means of the conveyor 16, the sheets being imposed one upon the other with their rough surfaces toward each other. These sets of plates are carried to the right through the kiln and during their passage therethrough are preferably heated to a temperature of about 275 degrees, the tunnel kiln being provided with burners or other heating means not shown for gradually raising the temperature therein from atmospheric temperature to the temperature indicated. In their passage through the kiln, the glass sheets may be supported on the metal plates A, as shown, or may be carried directly on the rolls.

The laminating chamber 2 is preferably provided with glass windows 17 on its two sides and end and also has openings 18 beneath the windows through which the operator may work in applying the material which adheres the sheets together. Mounted for vertical movement in the chamber is a vacuum frame 19 supported upon the cables 20 passing around the four drums 21. The drums are mounted upon shafts 22 and 23 in driving connection by means of the chain 24 passing around sprockets keyed to the shafts. The shaft 22 is driven from a motor 25 operating through reduction gearing in the casing 26. On the lower side of the chamber is a transfer table comprising the framework 27 carrying the rolls 28. This frame is mounted upon pairs of cranks 29, 29, which are swung back and forth to raise and lower the table by means of the links 30 and 31, the link 30 being connected at its right hand end to an operating crank 32. This crank is rotated from the motor 33 which operates through reduction gearing in the casing 34.

As shown in Fig. 2, the table is in position to receive the pairs of sheets from the upper runway of the kiln. The plate A carrying the sheets is partially carried onto the rollers of the table by the rotation of the rollers 3 of the kiln runway, and can then be moved the remaining distance to bring them completely onto the table by a hook in the hands of the operator. When a pair of sheets has been positioned upon the transfer table, the vacuum frame 19 is lowered so as to engage the upper sheet of the pair, and it is then lifted to the position shown in Fig. 2 in order to give the operator room to apply cementing material to the sheet remaining on the table. This cement may be of any suitable type, but is preferably hot asphalt which is either sprayed or flowed onto the surface of the glass through the tool 35 in the hands of the operator, although this may be accomplished in various ways which are immaterial in so far as the present invention is concerned. After the lower sheet is coated with the asphalt, the motor 25 is operated to lower the vacuum frame, so that the sheet of glass carried thereby is imposed upon the lower sheet, thus completing the laminating operation. The motor 33 is now operated to lower the table so that the rollers 28 are in line with the rollers 4 of the lower runway, at which time the operator pushes the plate A carrying the sheets far enough along on the rollers 4 to permit the friction of such rollers to drag the plate into the kiln. A second pair of sheets is now brought from the upper runway into position for lamination in the chamber 2, and the operation is repeated. The laminated plates are carried through the kiln to the left hand end thereof, and during such movement, their temperature is gradually reduced, so that when they arrive at the extreme end of the runway, they are in condition for handling and the adhesive has set so that the sheets are securely cemented together. As the laminated sheets arrive at the left hand end of the kiln, they are removed by the vacuum frame 16.

A pan 36 is preferably provided beneath the transfer table 27 for receiving the excess asphalt which may escape over the edges of the plate A during the application of the asphalt to the glass sheet carried thereby. A drainage pipe 37 conducts the asphalt from the pan 36 to a suitable receptacle (not shown).

From the foregoing, it will be seen that the operation may be carried on in a continuous cycle with two operators, one attending to the laminating operation and the other operating the vacuum frame at the inlet end of the kiln. The one kiln takes care of the gradual heating of the sheets preparatory to laminating and of the gradual cooling of the sheets after laminating, and any danger of breaking the glass in heating and cooling and in handling is reduced to a minimum. While the operation and materials employed have been described specifically, it will be understood that the invention is not so limited. Other kinds of glass may be laminated, and a variety of adhesives may be employed. If desired, a sheet of material, which becomes adhesive on the application of the hot glass sheet, may be substituted for the asphalt, or a sheet of material that has its surfaces covered with a cementing material, which similarly becomes adhesive on the application of the glass sheets.

What I c'aim is:

1. In combination in apparatus for laminating glass sheets, a tunnel kiln maintained at increasing temperature from its inlet to its outlet end and provided with two sets of conveying means one above the other driven in opposite directions adapted to carry the sheets back and forth through the kiln, a transfer table at the outlet end of the kiln having the higher temperature in position to receive the sheets from one conveying means and transfer them to the other conveying means, and vacuum lifting means above the transfer table adapted to lift one of each pair of sheets above the table and then lower it onto the other of said pair of sheets.

2. In combination in apparatus for laminating glass sheets, a tunnel kiln maintained at increasing temperature from its inlet to its outlet end and provided with two sets of conveying means one above the other driven in opposite directions adapted to carry the sheets back and forth through the kiln, a vertically movable transfer table at the outlet end of the kiln adapted in one position to receive the sheets from one of the conveying means and in another position to transfer them to the other conveying means, and vacuum lifting means above the transfer table adapted to lift one of each pair of sheets above the table and then lower it onto the other of said pair of sheets.

3. A process for laminating glass sheets which consists in carrying them one upon the other in pairs through a tunnel kiln, in which they are exposed to increasing temperature as they progress through the kiln, lifting the upper sheet of each pair when it arrives at the outlet end of the kiln, applying a cementing layer between the separated sheets, replacing the upper sheet of each pair upon its lower sheet, and returning the pairs of sheets thus laminated to the inlet end of the kiln.

4. A process of laminating glass sheets which consists in carrying them in pairs one upon the other through a tunnel kiln exposed to increasing temperature, arresting the movement of the sheets through the kiln when they are sufficiently heated for lamination, separating the sheets of each pair and applying a cementing medium therebetween, reassembling the pairs of sheets, and returning them through the kiln exposed to the gradually decreasing temperature thereof.

5. A process of laminating glass sheets which consists in carrying them in pairs one upon the other through a tunnel kiln exposed to increasing temperature, arresting the movement of the sheets through the kiln when they are sufficiently heated for lamination, separating the sheets of each pair and applying a hot fluid cement which hardens on cooling therebetween, reassembling the pairs of sheets, and returning them through the kiln exposed to the gradually decreasing temperature thereof.

MAURICE E. CARLISLE.